UNITED STATES PATENT OFFICE.

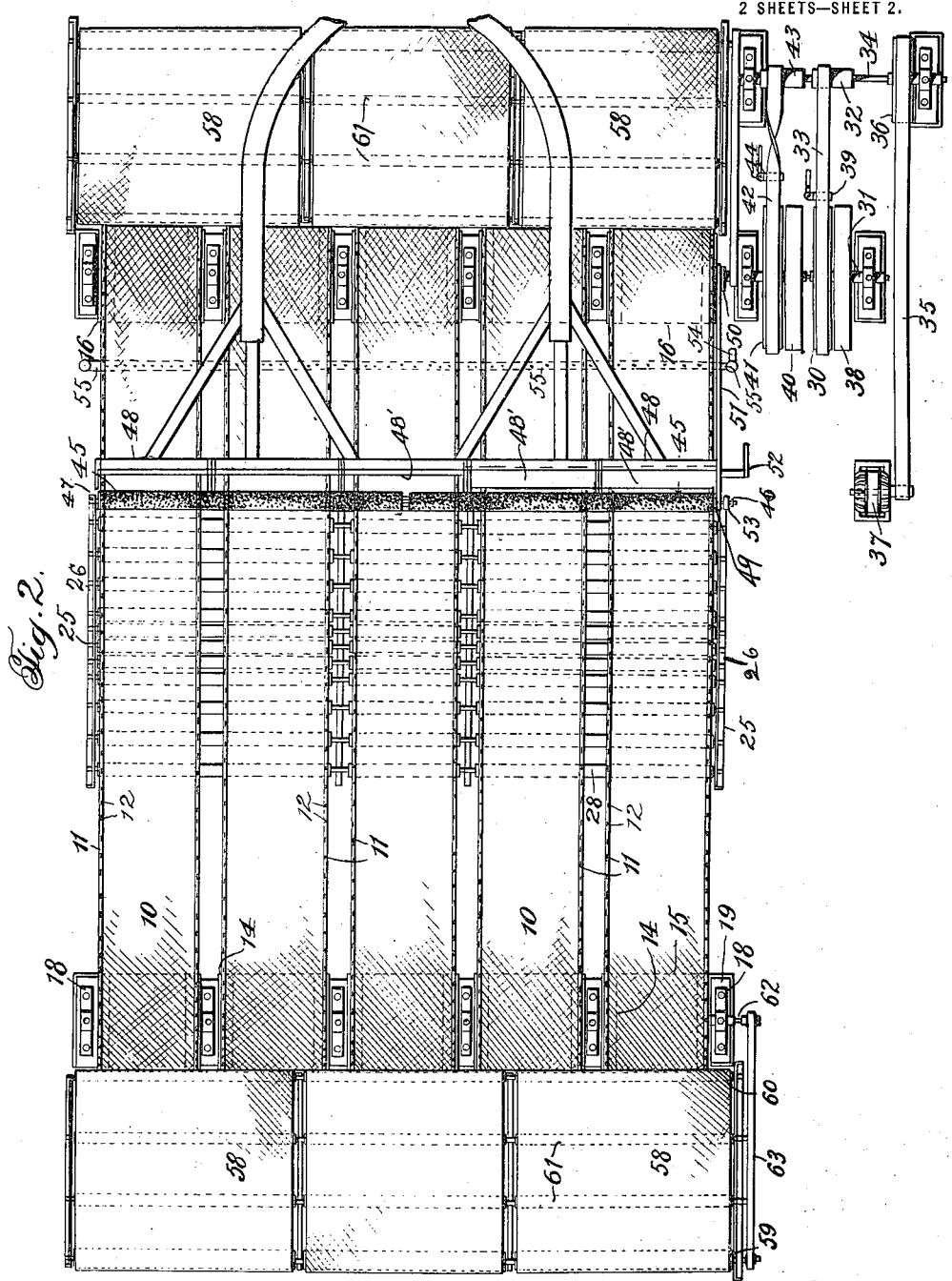

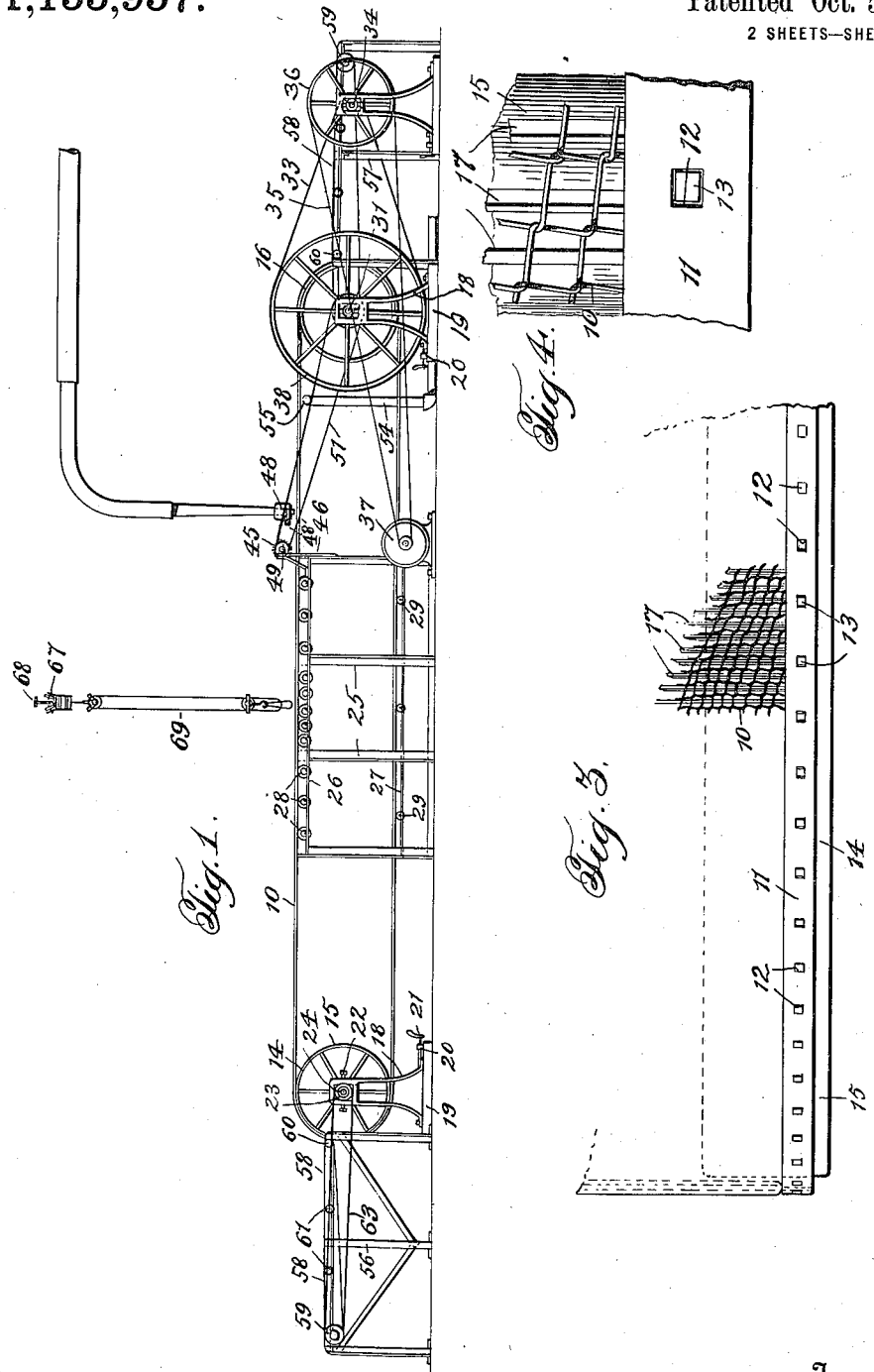

JOHN R. POWELL, OF NEW YORK, N. Y.

CARPET-CLEANING MACHINE.

1,155,957.  Specification of Letters Patent.  Patented Oct. 5, 1915.

Application filed August 11, 1913.  Serial No. 784,143.

*To all whom it may concern:*

Be it known that I, JOHN R. POWELL, a citizen of the United States, and resident of Brooklyn, city of New York, State of New York, have invented certain new and useful Improvements in Carpet-Cleaning Machines, of which the following is a specification.

This invention relates to cleaning machines, and more particularly to a machine by means of which carpets or rugs may be thoroughly cleaned of substantially all dust and dirt by brushing, suction or steam, or combinations of the foregoing.

One of the objects of the invention is to provide a simple mechanism for thoroughly cleaning carpets, or other articles of the same description in which the dust and dirt removed from the carpet does not escape into the room, but is removed by suction.

Another object is to combine an air suction and other cleaning means with a novel revolving wire carrier for the article to be cleaned which will permit free access of air to the article and properly support the article for its movement in either direction past the cleaning devices.

Further features include the novel means for supporting the wire conveyer and maintaining the same at a proper tension, and the novel driving mechanism therefor.

Other objects and novel features of the invention will be apparent from the following description taken in connection with the drawings in which, Figure 1 is a side elevation of a machine embodying my invention; Fig. 2 is a plan view of the same, Fig. 3 is a detail view showing the construction of the woven wire fabric carrier or conveyer and one of its supporting drums, and Fig. 4 is an enlarged detail of the same.

Referring to the drawings, 10 designates a narrow endless belt carrier or conveyer made of woven wire fabric, as shown in Figs. 3 and 4 and is edged with brass or other soft metal to provide a selvage 11 at each edge. The selvage 11 is provided with perforations 12 at intervals lengthwise of the same, and spaced apart a sufficient distance to receive the teeth 13 of a sprocket 14 formed at the end of each of the supporting drums 15 and 16 around which the endless conveyer passes. It will be noted that the machine has a plurality of separate drums which has the advantage that the woven wire fabric can be made up in narrow widths which lessens the sagging of the fabric and also makes it possible to manufacture the cleaning machine in any desirable number of widths of single narrow conveyers. Furthermore, it reduces the expense of weaving the wire in greater widths, makes it possible to operate a single width or as many as desired, depending on the width of the material to be cleaned.

The drums 15 and 16, around which the conveyer belts 10 pass, are composed of cylinders of wood, iron or other suitable material, and are provided with sprockets at their ends while fastened to the faces of the drums intermediate the ends of the sprockets there are a number of longitudinally extending thin vertical metal ribs 17 which engage the spaces in the wire fabric between the looped parts of the wires comprising the fabric, as shown in Figs. 3 and 4. The wire fabric is so woven that the looped-together parts of the wires lie in straight lines, the lines of wires extending across the fabric being so disposed as to lie substantially parallel to the ribs 17 of the drums whereby the latter engage between the crosswise extending wires and have a better gripping action on the carrier belt. The carrier thus grips the drums at a number of points transversely of the web so that the carrier and the carpet or rug thereon will not be pulled out of shape at the center, since the wire carrier is kept at an even tension between the edges as well as at the edges thereof. Furthermore on account of the retarding force exerted by the suction cleaning device 48, which extends across the carrier and draws the article thereon and the carrier up to it, it is essential that there be some positive engagement between the drum and the web or carrier all the way across the latter as an ordinary friction drive is not adequate.

The drums 15 and 16 are each supported by pedestals 18, the bases of which are fastened to base-plates 19 which are bolted to the floor. Lugs 20 are cast integral with the base frames 19 and are threaded to receive adjusting bolts 21 which engage the bases of the pedestals 18 and by means of which in a well known manner, the said pedestals may be adjusted in either direction to tighten or loosen up the wire fabric in case it stretches or becomes too tight during the operation of the machine. The pedestals 18 are also provided with set screws 22 which bear at their inner ends against movable bearing boxes 23 so that the shafts 24 of the drums may be adjusted as desired.

On account of the drums 15 and 16 being spaced a considerable distance apart in order to provide the necessary length for the material to be cleaned, the conveyer between the drums may sag at the center under heavy loads. To suitably sustain the conveyer near the center so as not to stretch it when a weight passes this point, I provide a frame 25 intermediate the drums 15 and 16 comprising vertical supports and horizontal upper and lower connecting members 26 and 27. The upper horizontal members 26 rotatably support a series of rollers 28 which contact with the under surface of the wire fabric conveyer 10 and are freely rotatable, while the rollers 29, supported on the lower horizontal member 27 contact with the outer surface of the material supported on the wire conveyer, and are also freely rotatable. The rollers 28 and 29 may extend across one or two or more widths of conveyer, as is clearly shown in the plan view. The frame and rollers thus support the weighted conveyer so that there will be no sag at the center, thereby eliminating the tendency to stretch at this point.

The endless carrier or conveyer is driven in one direction by means of the pulley 30 which is fastened to the shafting 31 of the drum 16. The pulley 30 derives its power from the pulley 32 by means of the belt 33. The pulley 32 is keyed to the counter-shaft 34 which is driven by the pulley 36 and belt 35 which connects the same to the electric motor 37. Adjacent the pulley 30 there is a pulley 38 loose on the shaft 31 and to which the belt 33 may be shifted by means of a suitable shifter 39. Another fast pulley 40 and loose pulley 41 are mounted on the shaft 31 and the cross belt 42 passing over the pulley 43 on the counter-shaft 34 delivers power to the pulley 40 to run the same in a direction opposite to the pulley 30. A suitable belt shifter 44 is provided to shift the belt 42 from the pulley 40 to the pulley 41 or vice versa, as desired.

A cylindrical brush 45 is supported at its ends by the upright brackets 46 and 47 mounted on the frame 25, or the center may be supported from a hanger suspended from the ceiling or mounted on the floor of the room. In traveling in the direction from left to right the rug, carpet or article to be cleaned, is brought in contact with the brush 45, but the latter is kept high enough away from the rug or carpet so as not to injure the fabric but merely to freshen the nap before it passes under the air suction head 48, the inlet slot of which extends across the entire width of the conveyer. The brush 45 is driven by the pulley 49 which is fastened to the shaft of the brush and power is delivered to said pulley from the shaft 31 by means of a pulley 50 keyed to said shaft 31 and a belt 51 passing over the pulleys 49 and 50. This arrangement provides for the rotation of the brush in the direction of the movement of the conveyer. The belt 51 may be shifted laterally by means of the shifting lever 52 to move the belt onto a loose pulley 53 mounted on the shaft of the brush adjacent the fast pulley 49 so that the rotation of the brush can be stopped when desired by merely shifting the bar 52. The brush 45 serves to liven up the rug or carpet. A steam pipe 54 having a spray outlet head 55 at its upper end and extending across the lower side of the wire conveyer is adapted to supply a steam spray to the material being cleaned.

Tables 56 and 57 are located at opposite ends of the conveyer. The tables 56 and 57 are made up of endless belts 58 of a woven wire fabric like that shown in Fig. 4. The belts 58 pass around the end rollers 59 and 60 and are supported intermediate the rollers 59 and 60 by the rollers 61, which act in much the same manner as the rollers 28 on the frame 25. The table 57 is the same in construction as the table 56. Suitable supporting frames are provided for the rollers on the tables and power to move the wire belts on the table 56 is derived from the end 62 of shaft 24 of the drums 15 and transmitted to the end roller 59 by means of the belt 63, which passes over suitable pulleys connected to the respective shafts. The arrangement for driving the wire belt forming the table 57 is substantially the same, but it will be seen that when the top of the conveyer is driven from left to right the wire belt of the table 56 will feed toward the conveyer, while the wire belt of the table 57 will feed from the conveyer, whereas if the feed of the conveyer is reversed the feed of the wire tables will be reversed in a similar manner and the table 57 will feed toward the conveyer, while the table 56 will feed away from the drum 15.

The overhead carriage 67 running on the supporting track 68 placed above and at right angles to the conveyer has a chain block 69 depending therefrom so that any heavy rugs or carpets can be readily placed on the conveyer.

The arrangement shown and described provides a cleaning machine in which the rug or carpet can be placed in position on the conveyer where it is cleaned without undue labor or time. It can be attached to the conveyer and given several cleanings without removing it therefrom. A conveyer of this type can be constructed large enough to be able to carry the largest rug or carpet running all of the widths and the combined length of the suction inlets while, by means of suitable slides in the heads of the suction device, the inlet openings can be reduced so that when only a single width of conveyer is used and a narrow rug or carpet is to be cleaned the power and suction necessary may be greatly economized. The slides are designated by the numeral 48' in Fig. 2, two of the slides being shown as partly open. The conveyer and other parts of the machine are accessible for the purpose of lubrication or repairs and the operation of the same will be readily apparent from the foregoing description.

As various changes may be made without departing from the spirit of the invention, I do not wish to be limited to the exact details as shown and described.

Having described my invention what I claim is:

1. In a cleaning machine of the class described, the combination of a carrier for the article to be cleaned, means for removing dust from the article supported by said carrier, a traveling device at one end of the carrier to receive the article being cleaned as it leaves the carrier, and means for driving said device in either direction whereby it is capable of removing the article from adjacent the end of said carrier when traveling in one direction and capable of moving the article toward the carrier when traveling in the opposite direction.

2. In a cleaning machine of the class described, the combination of a pair of spaced drums, a carrier for the article to be cleaned comprising an endless loop passing around the drums, means located in a position to remove dust from the article on said carrier, and traveling devices at the ends of said carrier to receive the article and remove it from adjacent either end of said carrier as it leaves the latter.

3. In a cleaning machine of the class described, the combination of a carrier capable of supporting the article while it is being cleaned, means for cleaning the article supported on said carrier, and a traveling device at one end of the carrier to receive the article as it leaves the carrier, and means for driving said carrier and said device in either direction, whereby the latter is capable of removing the article from adjacent the end of said carrier when the device travels in one direction and capable of moving the article toward the carrier when the device travels in the opposite direction, said driving means being readily reversible so that the article may be moved back and forth past said cleaning means a plurality of times successively.

4. In a cleaning machine of the class described, the combination of a series of pairs of spaced drums arranged side by side, a separate conveyer passing around each pair of drums, means for driving any number of said separate conveyers in accordance with the width of the article to be cleaned, and means for removing dust from the article or articles carried by said conveyers.

5. In a cleaning machine of the class described, the combination of a series of pairs of spaced drums, an endless conveyer for the article or articles to be cleaned passing around each pair of drums, means for driving any one set of drums and conveyers in either direction, and means extending across the conveyers for removing dust from the article or articles carried thereby.

6. In a cleaning machine of the class described, the combination of a carrier for the article to be cleaned, means for removing dust from the article supported by said carrier, a traveling device at each end of the carrier capable of supporting the article being cleaned, the device at one end of the carrier being capable of moving the article toward that end of said carrier and the device at the opposite end of the carrier being capable of moving the article away from said opposite end, means whereby said carrier and the devices at its opposite ends may be driven in the same direction, and means for reversing the direction of said driving means whereby the article may be passed through said machine and back and forth past said dust removing means a plurality of times successively, each of said traveling devices alternately serving as a receiving device and as a feeding device for said article.

7. In a cleaning machine, the combination of a plurality of carriers, means whereby any number of said carriers may be operated, means for removing dust from the article or articles supported by said carriers, said dust removing means comprising a dust and air receiving device having its inlet close to the top surfaces of the carriers, and means for varying the size of the inlet of said device in accordance with the number of carriers being operated.

8. In a cleaning machine of the class described, the combination of a plurality of pairs of spaced drums, a plurality of carriers, one mounted on each pair of drums, a suction head having an inlet opening extending transversely of and disposed adjacent the upper surfaces of the carriers, and means whereby any number of said carriers may be operated to move said article past the inlet in said suction head.

9. In a cleaning machine of the class described, the combination of a plurality of pairs of spaced drums, a plurality of foraminous carriers, one mounted on each pair of drums, dust removing means above and between the ends of the carriers and extending transversely of and close to the top surfaces thereof to draw air therethrough and through the article to be cleaned, and means whereby any number of said carriers may be operated to move the article to be cleaned past said dust removing means.

10. In a cleaning machine of the class described, the combination of a plurality of pairs of spaced drums, a plurality of horizontally arranged endless foraminous carriers, one mounted on and passing around each pair of drums, devices between the ends of the carriers for supporting the sides thereof, a suction head between the ends of the carriers and extending transversely thereof, said head having an inlet opening disposed close to the top surface of each of the carriers to draw air through the foraminous carriers and dust from the article or articles to be cleaned, means whereby any number of said carriers may be operated to move said article past the inlet opening in said suction head, and means for varying the length of the suction mouth in accordance with the number of carriers being operated.

11. In a cleaning machine of the class described, the combination of a plurality of separate carriers, means whereby any desired number of said carriers may be operated, and means for removing dust from the article or articles on the carrier or carriers being operated.

In testimony whereof I affix my signature, in presence of two witnesses.

JOHN R. POWELL.

Witnesses:
MATTHEW A. POWELL,
NATHEN BUDEN.